United States Patent [19]

Fujiwara et al.

[11] 3,838,208

[45] Sept. 24, 1974

[54] CIRCUIT FOR REDUCING WHITE BALANCE VARIATIONS

[75] Inventors: Yoshihiro Fujiwara, Hirakata; Norio Meki, Takatsuki, both of Japan

[73] Assignee: Matsushita Electric Industrial Co., Ltd., Osaka, Japan

[22] Filed: Dec. 27, 1972

[21] Appl. No.: 318,768

[30] Foreign Application Priority Data

Dec. 28, 1971 Japan............................ 47–100

[52] U.S. Cl... 178/5.4 BT, 178/5.4 SD, 178/5.4 CK

[51] Int. Cl........................................... H04n 9/12

[58] Field of Search....... 178/5.4 R, 5.4 BT, 5.4 SD, 178/5.4 CK

[56] References Cited

UNITED STATES PATENTS 3,535,437 10/1970 Willis.......................... 178/5.4 BT 3,541,242 11/1970 Hall et al...................... 178/5.4 BT

*Primary Examiner*—Robert L. Richardson

*Attorney, Agent, or Firm*—Stevens, Davis, Miller & Mosher

[57] ABSTRACT

A color television receiver having a generator for generating a reference signal by means of ringing for applying this reference signal to a demodulator for the demodulation of a chrominance signal. In the receiver, an oscillator oscillating substantially at a frequency of 3.58 MHz is provided so as to apply its output to the demodulator during reception of a monochromatic television signal, thereby preventing undesirable variations of the white balance depending on the reception of a color television signal or monochromatic television signal irrespective of fluctuations of the characteristics of elements constituting the demodulator.

4 Claims, 4 Drawing Figures

CIRCUIT FOR REDUCING WHITE BALANCE VARIATIONS

This invention relates to a color television receiver.

Prior art color television receivers have been defective in that the white balance of a picture reproduced from a color television signal differs from that reproduced from a monochromatic television signal with the result that a good picture cannot be obtained.

With a view to obviating such a defect, it is an object of the present invention to provide means for preventing undesirable variations of the white balance depending on the reception of a color television signal or a monochromatic television signal.

Another object of the present invention is to provide a simple structure which can attain the above object without requiring any strict adjustment.

In accordance with the present invention, there is provided a color television receiver comprising a detector for detecting the presence or absence of a burst signal in a television signal, a reference signal generator for generating by means of ringing a reference signal synchronous in phase with the burst signal when the burst signal exists in the television signal, an oscillator oscillating by being controlled by the output of said detector for generating such reference signal when the burst signal does not exist in the television signal, a demodulator for demodulating a chrominance signal contained in the television signal in response to the application of both the chrominance signal and the reference signal generated by said generator, means for applying the output of said oscillator to said demodulator, and means for applying the output of said demodulator to a color picture tube for reproducing a televised picture.

The above and other objects, features and advantages of the present invention will be apparent from the following description taken in conjunction with the accompanying drawing, in which.

Figure 1:
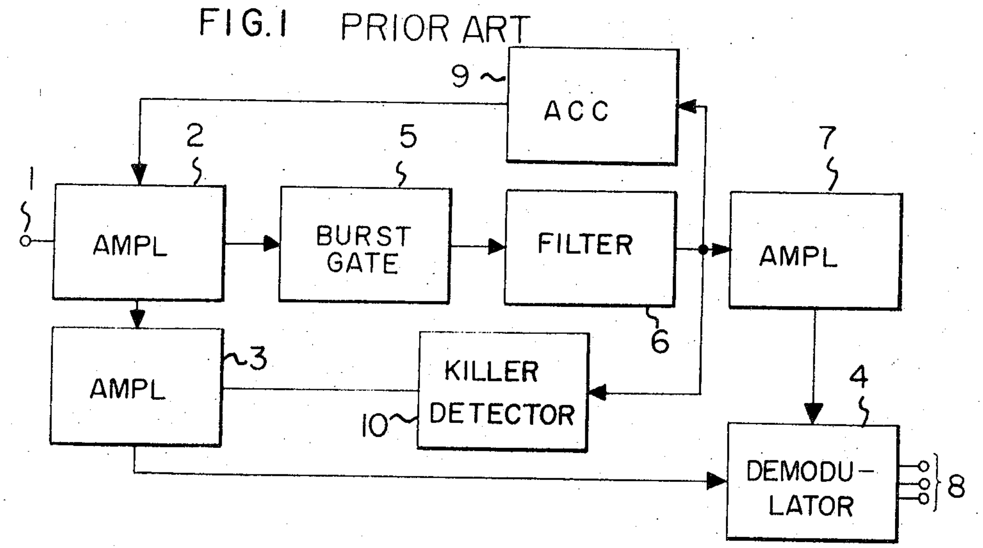
FIG.1 PRIOR ART
FIG. 1 is a block diagram of a main part of a prior art color television receiver.

Referring first to FIG. 1 showing parts of a prior art color television receiver, a chrominance signal is applied to an input terminal 1, then through a chrominance amplifier 2 and a chrominance output amplifier 3 to a demodulator 4. The output of the amplifier 2 is also applied to a burst gate 5 which separates the burst signal portion from the input signal. The burst signal is passed through a narrow-band filter 6 of quartz or the like and a continuous waveform having a frequency of 3.58 MHz is applied from a reference output amplifier 7 to the demodulator 4. In the demodulator 4, the chrominance signal applied from the amplifier 3 is subjected to synchronous detection by the reference signal applied from the amplifier 7 so that three color difference signals R - Y, B - Y and G - Y appear at output terminals 8 of the demodulator 4. An ACC (automatic color control) detector 9 detects the output of the filter 6, hence the level of the burst signal, and controls the gain of the amplifier 2 by the output thereof so as to continuously obtain a constant burst output. A killer detector 10 detects the presence or absence of the burst signal depending on the output of the filter 6 and turns off the amplifier 3 to interrupt the supply of the signal to the demodulator 4 from the amplifier 3 when no burst signal is present so as to eliminate color noise that may appear during reception of a monochromatic television signal. However, the ringing system differs from the AFPC (automatic frequency phase control) system and injection locking system of the continuous oscillation type, and thus, the reference signal which should be applied to the demodulator 4 cannot be obtained in the case of a black-and-white television signal which includes no burst signal. Ideally, the color demodulator 4 must be satisfactory in the carrier balance and the d.c. level of the three color difference signals at the output terminals 8 must be constant irrespective of the presence or absence of the reference signal. Actually, however, a perfect carrier balance cannot be expected due to fluctuations of the characteristics of circuit elements, especially diodes and transistors constituting the demodulator, and the d.c. level at the color difference output terminals 8 varies inevitably depending on the presence or absence of the reference signal. Therefore, direct application of the color difference outputs to a color picture tube through output amplifiers results in undesirable variations of the white balance depending on the reception of a color television signal or a monochromatic television signal.

With a view to eliminating such a drawback, the present invention provides means for applying to the demodulator a continuous waveform corresponding to the reference signal during the reception of a monochromatic television signal too so as to continuously maintain the d.c. level of the color difference outputs constant independently of the carrier balance and to make possible direct application of the color difference outputs to the color picture tube.

Figure 2:
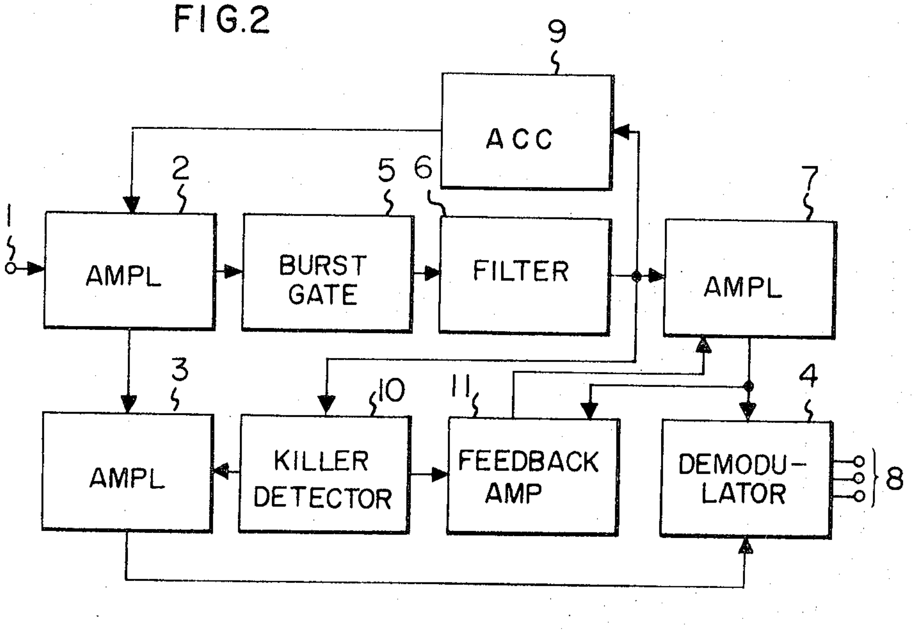
FIG. 2 is a block diagram of a main part of a color television receiver embodying the present invention.

FIG. 2 shows an embodiment of the present invention and like reference numerals are used therein to denote like parts appearing in FIG. 1. More precisely, the present invention proposes a system in which a feedback amplifier 11 is additionally provided in a system similar to that shown in FIG. 1. In the absence of the burst signal, this feedback amplifier 11 is energized by the output of a killer detector 10 and constitutes a feedback oscillator together with a reference output amplifier 7 so as to apply the reference signal to a demodulator 4. It should be noted that the killer detector 10 may be arranged to produce the output either of substantially zero level or of high level when a color television signal is received, and to produce the output either of a high level or of substantially zero level when a monochromatic television signal is received. During reception of a color television signal including the burst signal, the feedback amplifier 11 is in the deenergized state and does not participate in the application of the reference signal. Thus, the reference signal can be applied to the demodulator 4 during reception of a monochromatic television signal too and undesirable variations of the white balance due to variations of the d.c. level of the demodulator outputs can be eliminated. Further, due to the fact that the reference signal which is applied to the demodulator 4 during reception of a monochromatic television signal need not be strictly set at the frequency of 3.58 MHz, the design and adjustment of the oscillator constituted by the amplifiers 7 and 11 can be simplified. Furthermore, any color noise tending to deteriorate the quality of a reproduced picture does not appear during reception of a monochromatic television signal due to the fact that the amplifier 3 is deenergized by the output of the killer detector 10 in such a case and no signal is applied to the demodulator 4 from the amplifier 3.

Figures 3, 4:
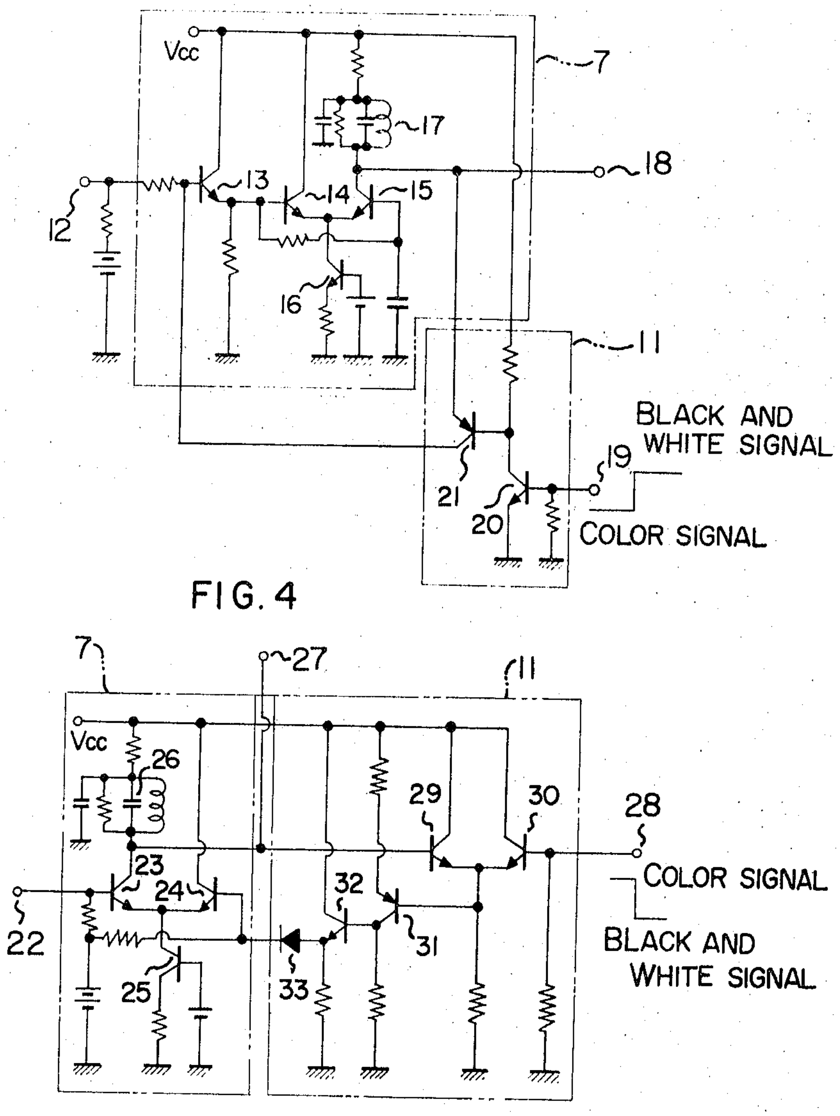
FIG. 3 is a circuit diagram showing one form of the practical structure of the reference output amplifier and feedback amplifier in the embodiment shown in FIG. 2.
FIG. 4 is a circuit diagram showing another form of the practical structure of the reference output amplifier and feedback amplifier.

FIG. 3 shows one form of the practical structure of the reference output amplifier 7 and feedback amplifier 11. Referring to FIG. 3, the reference signal is applied from a filter 6 to an input terminal 12 of the reference output amplifier 7 including a plurality of transistors 13, 14, 15 and 16 and a tank circuit 17 tuned substantially to a frequency of 3.58 MHz, and the output appears at an output terminal 18. The output of the killer detector 10 is applied to an input terminal 19 of the feedback amplifier 11 including a pair of switching transistors 20 and 21.

During reception of a color television signal, and if the killer detector 10 is arranged to produce a substantially zero level output in this case, no output appears from the killer detector 10 and the potential at the input terminal 19 of the feedback amplifier 11 is zero. Therefore, the transistors 20 and 21 are in the cut-off state and the feedback amplifier 11 is isolated from the other circuits of the system. In this case, the reference signal appearing from the filter 6 is applied to the emitter follower transistor 13 through the input terminal 12 and is amplified by the differential type reference output amplifying means composed of the transistors 14, 15 and 16 to be applied to the demodulator 4 from the output terminal 18.

On the other hand, when a monochromatic television signal is received, and if the killer detector is arranged to produce a high level output signal, the killer detector 10 applies a positive voltage output to the input terminal 19 thereby turning on the transistors 20 and 21 and the collector output of the transistor 15 is positively fed back to the base of the transistor 13 through the transistor 21 so as to produce an oscillation output having a frequency which is determined by the tuning frequency of the tank circuit 17. This output is derived from the output terminal 18 to be applied to the demodulator 4 as the reference signal.

It will thus be understood that the prior art, defect of undesirable variations in the white balance color depending on the reception of a monochromatic television signal or a color television signal can be obviated irrespective of fluctuations of the characteristics of diodes and transistors constituting the demodulator 4. Further, the demodulator 4 can be directly connected to the cathode-ray tube without the need for provision of compensating means such as a clamping circuit.

FIG. 4 shows another practical form of the reference output amplifier 7 and feedback amplifier 11. Referring to FIG. 4, the reference signal is applied from the filter 6 to an input terminal 22 of the reference output amplifier 7 including a plurality of transistors 23, 24 and 25 and a tank circuit 26 tuned substantially to 3.58 MHz, and the output appears at an output terminal 27. The output of the killer detector 10 is applied to an input terminal 28 of the feedback amplifier 11 including a plurality of switching transistors 29, 30, 31 and 32 and a switching diode 33.

During reception of a color television signal, if the killer detector 10 is arranged to produce a high level output is this case, the output of the killer detector 10 is sufficiently high and such a voltage is applied to the terminal 28. Therefore, the transistors 29, 31 and 32 and diode 33 are cut off and the feedback amplifier 11 is isolated from the other circuits of the system. In this case, the reference signal appearing from the filter 6 and applied to the input terminal 22 is amplified by the differential type reference output amplifying means composed of the transistors 23, 24 and 25 to be applied to the demodulator 4 from the output terminal 27.

On the other hand, when a monochromatic television signal is received, and if the killer detector 10 is arranged to produce a substantially zero level output, no output appears from the killer detector 10 and the potential at the input terminal 28 of the feedback amplifier 11 is zero. Therefore, the transistors 29, 31 and 32 are turned on and the diode 33 is forward biased with the result that the base potential of the transistor 24 rises. The collector current of the transistor 24 is thereby increased, while the collector current of the transistor 23 is reduced, and collector potential of the transistor 23, and hence the base potential of the transistor 29 rises. The rise in the base potential of the transistor 29 results in the rise in the base potential of the transistor 31, and the collector potential of the transistor 31, hence the base potential of the transistor 32 is reduced. The base potential of the transistor 24 is reduced through the diode 33 connected to the emitter of the transistor 32, and the collector potential of the transistor 23, hence the base potential of the transistor 29 is reduced, thereby causing reversal of the original state. Due to the fact that the tank circuit 26 tuned substantially to 3.58 MHz is included in this oscillation system, the system oscillates at substantially the frequency of 3.58 MHz and the reference signal having a continuous waveform appears at the output terminal 27 to be applied to the demodulator 4 during reception of the monochromatic television signal too. Therefore, the prior art defect of undesirable variations of the white balance depending on the reception of a monochromatic television signal or a color television signal can be obviated irrespective of fluctuations of the characteristics of diodes and transistors constituting the demodulator 4.

What is claimed is:

1. Circuitry for preventing white balance variations arising when switching from monochromatic television reception to color television reception and vice versa in a television receiver utilizing a reference signal generator of the ringing type, said circuit comprising:

a detector for detecting the presence or absence of a burst signal in a carrier chrominance signal supplied through a chrominance signal amplifier, a reference signal generator for generating by means of ringing a first reference signal synchronous in phase with the burst signal only when the burst signal exists in the carrier chrominance signal, said detector being connected to the output of said generator, an amplifying circuit including a feedback circuit, said amplifying circuit being connected to said reference signal generator, and said feedback circuit being further connected to said detector, said feedback circuit being energized or deenergized depending on the output of said detector, said feedback circuit being deenergized under the existence of the burst signal to cause said amplifying circuit to amplify the first reference signal from said reference signal generator, said feedback circuit being energized under the non-existence of the burst signal to cause said amplifying circuit to constitute a feedback oscillator incorporating said feedback circuit so as to produce a second reference signal, and a demodulator connected to said amplifying circuit and the chrominance signal amplifier, said demodulator demodulating a chrominance signal contained in the carrier chrominance signal in response to the application of both the chrominance signal and the first reference signal during reception of a color television signal, and said demodulator during reception of a monochromatic signal providing an output signal having a d.c. level which is not varied from that provided during reception of a color television signal owing to the second reference signal being applied to said demodulator.

2. Circuitry for preventing white balance variations as claimed in claim 1, wherein said amplifying circuit comprises a differential amplifying means and a resonance circuit tuned substantially to the frequency of said first reference signal, said differential amplifying means including a first and a second transistor, said first transistor being connected at the base circuit thereof to the output of said reference signal generator and said second transistor being connected at the collector circuit thereof to said resonance circuit and to said demodulator, and said feedback circuit includes switching means interposed between the base circuit of said first transistor and the collector circuit of said second transistor so that said switching means is turned on and offi depending on the output of said detector.

3. Circuitry for preventing white balance variations as claimed in claim 1, wherein said amplifying circuit comprises a differential amplifying means and a resonance circuit tuned substantially to the frequency of said first reference signal, said differential amplifying means including a first and a second transistor arranged so that said first transistor is connected at the base circuit thereof to the output of said reference signal generator and said second transistor is connected at the collector circuit thereof to said resonance circuit and to said demodulator, and said feedback circuit includes signal phase shifting means interposed between the collector circuit of said first transistor and the base circuit of said second transistor.

4. Circuitry for preventing white balance variations as claimed in claim 1, wherein said detector is a killer detector.

* * * * *